United States Patent [19]
LaBoccetta

[11] Patent Number: 5,551,741
[45] Date of Patent: Sep. 3, 1996

[54] FOOD HANDLING TONGS

[76] Inventor: Alfred C. LaBoccetta, 3421 W. School House La., Philadelphia, Pa. 19144

[21] Appl. No.: 441,111

[22] Filed: May 15, 1995

Related U.S. Application Data

[63] Continuation-in-part of Ser. No. 22,945, May 16, 1994, Pat. No. Des. 366,399.

[51] Int. Cl.$^6$ ............................................. A47J 43/28
[52] U.S. Cl. ......................... 294/7; 100/234; 294/118
[58] Field of Search ........................ 294/3, 7, 8, 8.5, 294/11, 16, 106, 118, 902; 99/380, 394; 100/104, 110, 116, 213, 234; D7/666, 686, 687

[56] References Cited

U.S. PATENT DOCUMENTS

| | | |
|---|---|---|
| D. 213,990 | 4/1969 | Lee . |
| D. 221,348 | 11/1971 | Myer et al. . |
| 629,082 | 7/1899 | Law . |
| 1,566,394 | 12/1925 | Gilder ........................................ 294/8.5 |
| 2,292,889 | 8/1942 | McKee ........................................ 294/7 |
| 2,484,461 | 10/1949 | Perry, Jr. . |
| 2,489,606 | 11/1949 | Allen ........................................ 294/7 |
| 2,887,948 | 5/1959 | Kramer et al. . |
| 2,891,814 | 6/1959 | Idoine et al. ........................... 294/106 X |
| 3,964,775 | 6/1976 | Boyd ...................................... 294/118 X |
| 4,002,365 | 1/1977 | Rader ........................................ 294/8 |
| 4,355,574 | 10/1982 | Bond et al. ............................. 294/118 X |
| 4,904,009 | 2/1990 | Kozlinski . |
| 5,335,591 | 8/1994 | Pozar ...................................... 294/7 X |

FOREIGN PATENT DOCUMENTS

| | | | |
|---|---|---|---|
| 491615 | 3/1953 | Canada ........................................ 294/7 |
| 26097 | of 1903 | United Kingdom ........................ 294/7 |

*Primary Examiner*—Johnny D. Cherry
*Attorney, Agent, or Firm*—Michael F. Petock, Esq.

[57] ABSTRACT

A food handling spatula-tongs which provides a means of picking up food and expressing excess oil or fat from the food prior to serving. The spatula-tongs are comprised of a pair of pivotally connected members with flat food compressing members mounted to one end of each of the pair of pivotally connected members. Each of the food compressing members is provided with apertures which are not aligned with apertures in the other compressing member. Both rectangular and pie (triangular) shaped compressing members are utilized to adapt the tongs maximally to various types of foods, including pizza pie. The compressing plates may be interchangeably and removably mounted to the tongs. The upper plate is pivotally mounted to the tongs to provide maximum compressing force for various types of foods.

4 Claims, 2 Drawing Sheets

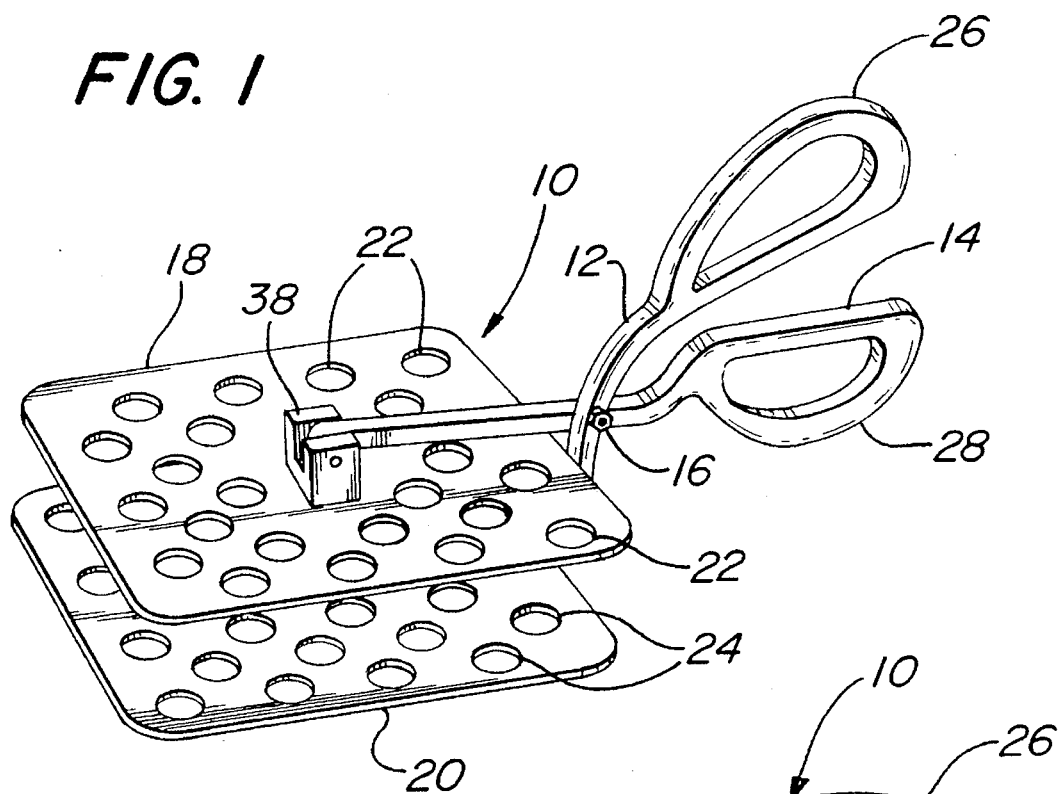
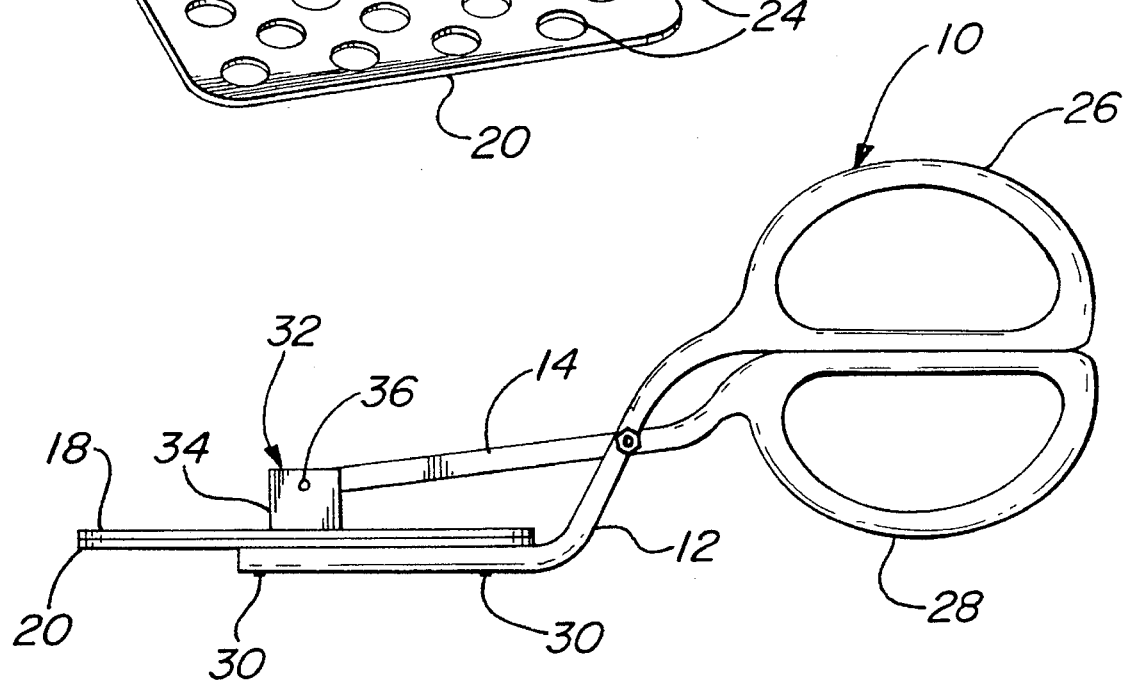

FOOD HANDLING TONGS

CROSS REFERENCE TO RELATED APPLICATION

This application is a continuation-in-part application of design patent application, Ser. No. 29/022,945, filed May 16, 1994, now U.S. Pat. No. Des. 366,399, by the inventor herein and entitled Food Handling Tongs. The benefit of the earlier filing date for so much as is common is hereby claimed.

FIELD OF THE INVENTION

The present invention relates to food handling tongs and, particularly to food handling tongs which are in the form of a pair of pivotally mounted spatulas with non-aligned openings in each spatula for the removal of oil or fat by the compression of the food between the opposing spatulas.

BACKGROUND OF THE INVENTION

It has been known for many years that the American public consumes an excess amount of fat in their diet. A substantial amount of this fat is consumed from fried and other foods from which a substantial amount of the fat could be removed by squeezing the excess oil or melted fat prior to serving. An attempt to solve this problem is disclosed in U.S. Pat. No. 4,904,009—Kozlinski. Kozlinski discloses food handling tongs with removable drip pans. However, Kozlinski does not disclose the new and improved oil or fat removing food spatula-tongs as disclosed and claimed herein.

SUMMARY OF THE INVENTION

The present invention facilitates the removal of fried food from frying oil, such as sliced eggplant, sliced squash, cutlets, chicken bits, etc., and the removal of excess oil or fat from such foods. The lower spatula may be inserted under the item of food to be picked up; once the food is removed from the oil, it may be squeezed to express the excess oil and allow it to drip into the pan. The food item may then be placed on a plate or other suitable location.

The spatula-tongs of the present invention may also be utilized to handle and express excess oil or fat from various other food items, including hamburgers being prepared on a grill and slices of pizza.

Briefly, in accordance with the present invention, a food handling spatula-tongs is provided which is comprised of a pair of pivotally connected members. A flat food compressing member or blade is mounted to one end of each of the pair of pivotally connected members. Each of the food compressing members is provided with apertures, the apertures in each member not being aligned with the apertures in the other member, thereby providing maximum compressive force to express excess oil or fat. With the flat shaped, relatively thin compressing members, food may easily be picked up from a frying pan, grill or the like and the excess oil or melted fat readily expressed and allowed to drip back into the pan, grill or other suitable location.

Further, in accordance with the present invention, the compressing members may be either rectangularly shaped or pie (triangular) shaped, which enables use with pie shaped food items, such as pizza.

Optionally, the compressing members may be removably mounted to the pivoted members, thereby allowing for interchangeability of the type of compressing plate used.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is view in perspective of one embodiment of the present invention.

FIG. 2 is a side elevation view of the embodiment of FIG. 1 of the present invention in a fully compressed position.

DETAILED DESCRIPTION OF THE PREFERRED EMBODIMENTS

Figure 3:
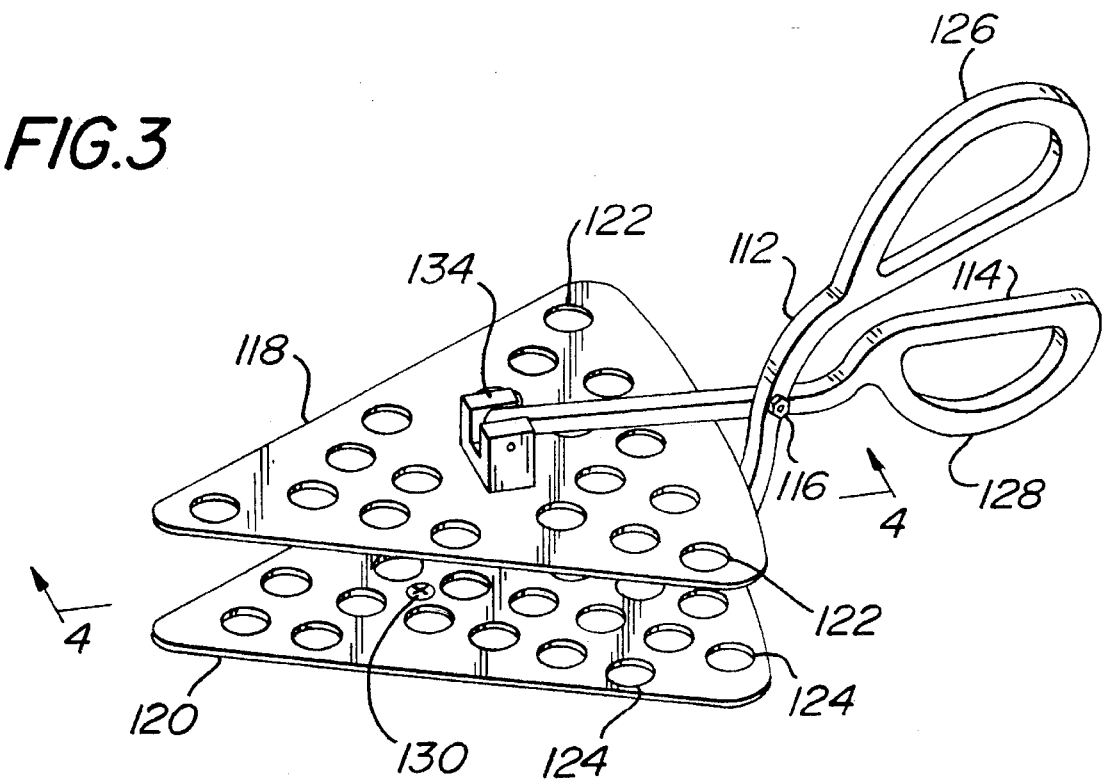
FIG. 3 is a view in perspective of another embodiment of the present invention utilizing pie (triangular) shaped compressing members.

Referring now to the drawings, wherein like numerals indicate like elements, there is shown a food handling spatula-tongs 10 in accordance with the present invention. The food handling spatula-tongs 10 are comprised of a pair of pivotally connected members 12 and 14, pivotally connected together at pivot 16, which may be a bolt as shown or other suitable pivot connection such as a pin. Flat food compressing members or blades 18 and 20 are mounted to one end of each of the pair of pivotally connected members, 12 and 14, respectively. Each of the food compressing members 18 and 20 is provided with apertures, the apertures in each member not being aligned with the apertures in the other member. In other words, flat compressing member 18 is provided with apertures 22 which do not align with apertures 24 in flat compressing plate 20. The staggered perforations in the upper compressing plate 18 and lower compressing plate 20 increase the effectiveness of removing oil or melted fat from the food item being squeezed between plates 18 and 20.

The rectangular plates 18 and 20 may, in a presently preferred embodiment, be 3 inches by 4 inches for smaller food items like chicken bits, sliced squash, potato pancakes, hamburgers and like. Larger compression plates 18 and 20 may be used for sliced eggplant, cutlets and the like. As will be described hereinafter in an alternate embodiment various types of compression plates may be utilized with the tongs. Rectangular plates or blades 18 and 20, as may be best seen in FIGS. 1 and 2, are mounted in a central portion thereof to elongated pivoted members 14 and 12, respectively, and are mounted such that a longer edge of rectangular blade 18 is parallel to elongated member 14 and that longer edge of blade 20 is parallel to elongated member 12. Compression plates 18 and 20 may be made of a heat resistant plastic, such as melamine, stainless steel, or other metals coated with a non-stick coating, such as tetrafluoroethylene fluorocarbon polymers or fluorinated ethylene-propylene, commercially available under the trademark Teflon®.

The pivoted members 12 and 14 are provided with handles. The pivot point may be moved and the handles may be between the pivot point and the compression plates. However, in a presently preferred embodiment, handles 26 and 28 are formed on pivotally connected members 12 and 14, respectively, on an end opposite the end on which the flat food compressing members 18 and 20 are mounted.

As may be best seen in FIG. 2, lower compression member or plate 20 is mounted to pivoted member 14 by suitable fasteners 30. These fasteners may be rivets, screws or other suitable fasteners. Alternatively, plate 20 may be adhesively mounted or welded to member 12. However, as will be discussed, with respect to FIGS. 3 and 4, plate 20 may be removably mounted to member 12 by removable fasteners, including screws, friction fit, spring mechanism or any other equivalent releasable fastener. Preferably, the portion of member 12 which extends under compression plate 20 would be made thin in the vertical direction to facilitate the lower member 20 being utilized to pick up food items from a frying pan, grill or the like.

Upper compression member or plate 18 is provided with a pivot attachment 32, which may be comprised of a block 34 mounted to the upper end of plate 18 and pivot pin 36 which passes through the end of member 14, in a recess 38 formed in block 34. The provision of pivot attachment 32 enables plate 18 to always assume a position parallel to plate 20 where the item of food is substantially flat, such as a potato pancake, or it enables it to assume an uneven position where the food is not substantially flat, thereby enabling maximum oil removing efficiency.

Figure 4:
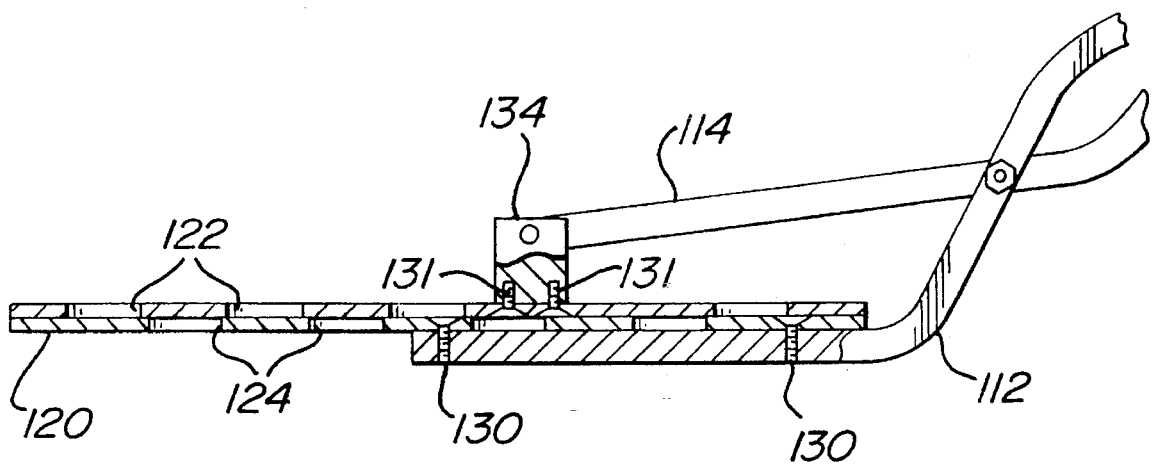
FIG. 4 is cross-sectional view taken along line 4—4 of FIG. 3.

Referring now to FIG. 3, there is shown another embodiment of the present invention, wherein the tong portion is substantially similar in design. The tong portion comprises pivoted members 112 and 114 pivoted at pivot 116. Pivoted member 112 is provided with handle 126 and pivoted member 114 is provided with a handle 128. Pie shaped compression members 118 and 120 are attached to one end of the pivotally connected members 112 and 114, respectively. Pie or triangular shaped members 118 and 120, as may be best seen in FIGS. 3 and 4, are mounted in a central portion thereof to elongated pivoted members 114 and 112, respectively, and are mounted such that an imaginary line bisecting triangular blade 118 is parallel to elongated member 114, as best seen in FIG. 3, and an imaginary line bisecting triangular blade 120 is parallel to elongated member 112. Pie shaped members 118 and 120 are suitable for picking up pie shaped items, such as pizza pie, and squeezing excess oil from them. As with the other embodiment, apertures 122 in compression plate 118 do not align with the holes 124 in compression plate 120 to provide maximum oil expressing effectiveness. As may be seen in FIGS. 3 and 4, compression plate 120 may be removably mounted to pivoted member 112 by screws 130. The upper plate 118 is also removably mounted to pivot attachment block 134 by screws 131.

The removable mounting structure described herein with respect to FIGS. 3 and 4 may also be utilized in connection with the embodiment of FIGS. 1 and 2. Plates 118 and 120 may be constructed of suitable materials as described with respect to plates 18 and 20. Screws 130 and 131 are shown as illustrative of a suitable, releasable, fastening system between the interchangeable plates and the pivoted members, but it is understood that various other types of suitable, releasable fasteners may be utilized in practicing the present invention, including those which use a friction fit or spring fit, for example, expanded spring pins that fit into a hole.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. Food handling tongs, comprising:

a first elongated member having a handle at one end and means for connecting at the other end;

a second elongated member having a handle at one end and a first pivotal connection at the other end;

said first and said second elongated members being pivotally connected together by a second pivotal connection at a point between said handle and the other end of each of said first and second elongated members;

a first flat food blade mounted to said means for connecting on said first elongated member;

a second flat food blade mounted to said first pivotal connection on said second elongated member;

said first flat food blade and said second flat food blade being provided with apertures, said apertures in said first flat food blade not being aligned with said apertures in said second flat food blade;

said first flat food blade and said second flat food blade each being formed in the shape of a triangle;

said first triangular shaped flat food blade being mounted to said first elongated member in a central portion of said first triangular flat food blade such that an imaginary line bisecting said first flat food blade is parallel to said first elongated member;

said second triangular shaped flat food blade being mounted to the first pivotal connection on said second elongated member in a central portion of said second triangular flat food blade such that an imaginary line bisecting said second triangular shaped flat food blade is parallel to said second elongated member; and whereby an item of food may be picked up by and between said first flat food blade and said second flat food blade.

2. Food handling tongs in accordance with claim 1 wherein said first flat food blade is removably mounted to the means for connecting on said first elongated member and said second flat food blade is removably mounted to the first pivotal connection on said second elongated member.

3. Food handling tongs, comprising:

a first elongated member having a handle at one end and means for connecting at the other end;

a second elongated member having a handle at one end and a first pivotal connection at the other end;

said first and said second elongated members being pivotally connected together by a second pivotal connection at a point between said handle and the other end of each of said first and second elongated members;

a first flat food blade mounted to said means for connecting on said first elongated member;

a second flat food blade mounted to said first pivotal connection on said second elongated member;

said first flat food blade and said second flat food blade being provided with apertures, said apertures in said first flat food blade not being aligned with said apertures in said second flat food blade;

said first flat food blade and said second flat food blade each being formed in the shape of a rectangle;

said first rectangular shaped flat food blade being mounted to said first elongated member in a central portion of said first rectangular flat food blade such that a longer edge of the first rectangular shaped flat food blade is parallel to said first elongated member;

said second rectangular shaped flat food blade being mounted to the first pivotal connection on said second elongated member in a central portion of said second rectangular flat food blade such that a longer edge of the second rectangular shaped flat food blade is parallel to said second elongated member; and whereby an item of food may be picked up by and between said first flat food blade and said second flat food blade.

4. Food handling tongs in accordance with claim 3 wherein said first flat food blade is removably mounted to the means for connecting on said first elongated member and said second flat food blade is removably mounted to the first pivotal connection on said second elongated member.

* * * * *